Patented Jan. 12, 1954

2,666,063

UNITED STATES PATENT OFFICE 2,666,063

MERCAPTOHYDANTOINS

James J. Spurlock, Denton, Tex.

No Drawing. Application September 28, 1951,
Serial No. 248,863

4 Claims. (Cl. 260—309.5)

This invention relates to 5-phenyl-5-ethyl-mercaptohydantoin and its salts.

The novel compounds of this invention may be represented by the formula:

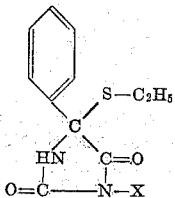

wherein X is a member of the group consisting of hydrogen, alkali metal, alkaline earth metal, ammonium and substituted ammonium radicals.

5 - phenyl - 5 - ethylmercaptohydantoin is prepared by condensing benzaldehyde with potassium cyanide to give 5-phenyl-hydantoin, which is brominated to form 5 - bromo - 5 - phenyl-hydantoin. The latter is treated with ethylmercaptan to yield 5 - phenyl - 5 - ethylmercaptohydantoin.

The salts of the new hydantoin are readily prepared by reacting stoichiometric quantities of the hydantoin and a base such as an alkoxide of the desired metal, or a basic ammonium or substituted ammonium compound. For example, the sodium salt of 5 - phenyl - 5 - ethylmercaptohydantoin is prepared by reacting equimolecular quantities of sodium ethoxide and 5-phenyl-5-ethylmercaptohydantoin in ethanol solution. Other alkoxides such as the methoxide or the isopropoxide are equally suitable. For the preparation of substituted ammonium salts, a molecularly equivalent amount of the substituted ammonium base, for example, ethylamine or ethylene diamine, is added to a solution of the 5-phenyl-5-ethylmercaptohydantoin in an inert solvent. To obtain the dry salt, the solution is evaporated to dryness.

The preferred salts of the new hydantoin are the pharmaceutically useful salts, that is to say, those salts which are not materially more toxic than the hydantoin base itself, and which exhibit solubility properties which render them capable of incorporation in pharmaceutical extending media or diluents to form compositions suitable for therapeutic use.

5-phenyl-5-ethylmercaptohydantoin and its salts possess unusual utility in treating epilepsy. They have uncommon properties inasmuch as they are effective for the treatment of both grand mal and petit mal seizures, while at the same time being substantially devoid of hypnotic action.

5-phenyl-5-ethylmercaptohydantoin and its salts can be administered orally in the form of tablets or in gelatin capsules, or dispersed in a pharmaceutical extending medium such as an elixir or the like. Alternatively, solutions of the salts of 5-phenyl-5-ethylmercaptohydantoin can be prepared in water or other pharmaceutical diluent and the solutions employed for parenteral administration.

The following examples illustrate the new compounds and their preparation.

Example I

To a solution of 96 g. (1.5 mols) of potassium cyanide in 200 cc. of water, contained in a flask fitted with a suitable air condenser, are added 342 g. (3 mols) of ammonium carbonate, 106 g. (1 mol) of benzaldehyde, and 250 cc. of ethanol. The mixture is heated for about 2½ hours at 55° C., and thereafter the alcohol is evaporated under a stream of air. The residue is acidified with concentrated hydrochloric acid to precipitate the 5-phenylhydantoin formed in the reaction. The precipitate is filtered off, dissolved in 600 cc. of 5 percent aqueous sodium hydroxide solution, and decolorized with activated charcoal. The decolorized solution is filtered, acidified with concentrated hydrochloric acid and the precipitate which forms is filtered off and purified by crystallization from a minimum quantity of boiling water. White crystals of 5-phenylhydantoin are formed, melting at about 178°–179° C.

A three-necked flask fitted with a mercury-sealed stirrer, a dropping funnel and a water-cooled condenser equipped with a drying tube is thoroughly dried in an oven, and 20 g. (0.114 mol) of dry 5-phenylhydantoin and a few pieces of Carborundum are placed in the dried flask. 60 cc. of anhydrous acetic acid are added, the mixture is heated to 80° C. and stirring is continued until all of the 5-phenylhydantoin is dissolved. The temperature of the solution is then lowered to about 75° C. and a solution of 30 g. of bromine in 40 cc. of anhydrous acetic acid is added with stirring over a period of about 15 minutes. The stirring is discontinued and the temperature of the reaction mixture is slowly raised until the reaction begins. The mixture is then heated at 100–105° C. for about 2½ hours. The contents of the tightly stoppered flask are frozen. After standing overnight, the frozen mixture is melted and filtered through a sintered glass funnel fitted with a rubber stopper and drying tube. The precipitate, consisting of 5-bromo-5-phenylhydantoin formed in the reaction, is washed with small amounts of anhydrous acetic acid and anhydrous ether, and is dried in a vacuum desiccator. It melts with decomposition at about 210° C.

To a solution of 0.9 g. (0.039 mols) of sodium in 20 cc. of cold absolute ethanol are added 2.1 g. (0.039 mols) of cooled ethylmercaptan, and 10 g. (0.039 mol) of 5-bromo-5-phenylhydantoin, added in about 3 portions. The reaction mixture is agitated and cooled after each addition of hydantoin. After the reaction is completed the reaction mixture is acidified with cold 10 percent aqueous hydrochloric acid and the major portion of the alcohol is allowed to evaporate without heat, yielding as a residue 5-phenyl-5-ethylmercaptohydantoin. The residue is recrystallized by dissolving it in a minimum quantity of ethanol at room temperature, adding water until the solution becomes cloudy and cooling the mixture in an ice bath. The crystalline 5-phenyl-5-ethylmercaptohydantoin is filtered off and dried. It melts at about 144–145° C.

*Example II*

To a solution of 2.36 g. (0.01 mol) of 5-phenyl-5-ethylmercaptohydantoin in 20 cc. of ethanol is added a solution of sodium ethoxide formed by dissolving 2.3 g. (0.1 mol) of sodium in 40 cc. of absolute ethanol. The reaction mixture is then evaporated to dryness in vacuo, and the residue is heated under vacuum on a steam bath to insure the removal of the last traces of alcohol. The residue consists of the sodium salt of 5-phenyl-5-ethylmercaptohydantoin.

Other alkali metal salts, such as the potassium and lithium salts of 5-phenyl-5-ethylmercaptohydantoin are prepared in a similar manner except that potassium ethoxide or lithium ethoxide is employed instead of the sodium ethoxide. The calcium and magnesium salts are prepared in a similar manner.

*Example III*

To a solution of 47.2 g. (0.2 mol) of 5-phenyl-5-ethylmercaptohydantoin in 200 cc. of absolute ethanol is added a solution of 9.8 g. (0.2 mol) of ethanolamine in 50 cc. of absolute ethanol. The reaction mixture is evaporated to dryness in vacuo, on a steam bath. The residue comprises the ethanolamine salt of 5-phenyl-5-ethylmercaptohydantoin.

Other amine salts such as the propanolamine and the like are prepared in a similar manner.

I claim:
1. 5-phenyl-5-ethylmercaptohydantoin.
2. The sodium salt of 5-phenyl-5-ethylmercaptohydantoin.
3. The ethanolamine salt of 5-phenyl-5-ethylmercaptohydantoin.
4. A compound having the formula

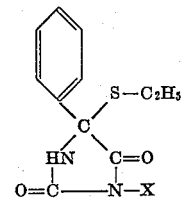

wherein X is a radical of the group consisting of hydrogen, alkali metal, alkaline earth metal, and lower alkanolamine radicals.

JAMES J. SPURLOCK.

References Cited in the file of this patent
UNITED STATES PATENTS

| Number | Name | Date |
|---|---|---|
| 2,404,509 | Long | July 23, 1946 |

OTHER REFERENCES

Merritt et al.: J. Pharmacol., 84, 67–73 (1945).